United States Patent [19]
Farfan

[11] Patent Number: 5,946,378
[45] Date of Patent: *Aug. 31, 1999

[54] INFORMATION ON HOLD TELEPHONY SERVICE

[75] Inventor: Daniel Joseph Farfan, Phoenix, Ariz.

[73] Assignee: AG Communication Systems Corporation, Phoenix, Ariz.

[*] Notice: This patent issued on a continued prosecution application filed under 37 CFR 1.53(d), and is subject to the twenty year patent term provisions of 35 U.S.C. 154(a)(2).

[21] Appl. No.: 08/686,779

[22] Filed: Jul. 26, 1996

[51] Int. Cl.⁶ .................................................... H04M 1/64
[52] U.S. Cl. ...................................... 379/88.23; 379/212
[58] Field of Search ................................. 379/67, 88, 89, 379/202, 212, 67.1, 88.16, 88.17, 88.23, 88.24

[56] References Cited

U.S. PATENT DOCUMENTS

| | | | |
|---|---|---|---|
| 4,577,067 | 3/1986 | Levy et al. | 379/67 |
| 5,434,906 | 7/1995 | Robinson et al. | 379/67 |
| 5,557,658 | 9/1996 | Gregorek et al. | 379/67 |
| 5,590,187 | 12/1996 | Greenspan | 379/212 |

*Primary Examiner*—Daniel S. Hunter
*Attorney, Agent, or Firm*—Gregory G. Hendricks

[57] ABSTRACT

An on hold telephone service that allows a subscriber to the service to place a call on hold and make information services available to the party placed on hold. The on hold service can be implemented on a central office switch or an enhanced services platform connected to the switch. The on hold service is accessed by the subscriber to the service through a transfer function that causes the call to be maintained by the on hold service. The party so placed on hold by the subscriber can then interactively acquire the various types of information made available by the service, such as news, weather and stock market information. The subscriber to the service can then send a message to the other party or cause him to be reconnected to the subscriber either immediately or when the other party is finished using the service and is ready to be reconnected to the subscriber.

18 Claims, 13 Drawing Sheets

INFORMATION ON HOLD TELEPHONY SERVICE

CROSS REFERENCE TO RELATED APPLICATIONS

Cross reference is made to the related U.S. Patent Applications entitled: "Telephone Call On Hold Service For A Party Placed On Hold By Another Party" (Ser. 08/686,780 filed Jul. 26, 1996); and "Games On Hold Telephony Service" (Ser. No. 08/686,778 filed Jul. 25, 1996) filed on the same date, and by the same assignee as this Application.

FIELD OF THE INVENTION

The present invention relates to telephony service and more particularly to an information-on-hold service which allows a subscriber to the service to temporarily dispose of a telephone call by transferring the other party to the information-on-hold service. That other party can then access information-on-hold until he or the subscriber requests that the parties be reconnected.

BACKGROUND OF THE INVENTION

Call on hold service is old and well known. Typically, when a party wishes to place another party on hold, the party placing the call on hold presses the hold button on his telephone. That telephone, or the associated PABX or central office switch, then maintains the connection to the other party while allowing the party who placed the call on hold to hang up. Such call on hold services also typically provide music or an announcement on hold feature, which causes music or voice to be played over the line to the party placed on hold. Such call on hold services are useful to the party who places the call on hold, but they are often a cause of discontent to the party who has been placed on hold, even if he is provided with music to listen to, while on hold.

Accordingly, it is an object of the present invention to provide an on-hold service that provides the person placed on hold with the ability to access information while on hold, rather than suffer the discontent associated with being placed on hold and having nothing to do but wait for the other party to return to the call.

SUMMARY OF THE INVENTION

The information-on-hold system of the present invention typically includes a computer such as an enhanced services platform (ESP) connected to a central office or other switching system. The information-on-hold software is resident on the ESP and can be accessed by a subscriber to the information-on-hold system when he decides to put the other party to a telephone call on hold.

The subscriber accesses the information-on-hold system through a transfer or direct access function. When so accessed the information-on-hold system instructs the subscriber to hang up his telephone in order to activate the information-on-hold service. When the subscriber hangs up the switching system connects the other party to the ESP and disconnects the subscriber from the ESP. The information-on-hold system then sends prompt messages to the other party indicating the various information options available to that party. That party then requests selected information by sending information selection response messages to the information-on-hold system which then sends the requested information to that other party.

DESCRIPTION OF THE PREFERRED EMBODIMENT

Figure 1:
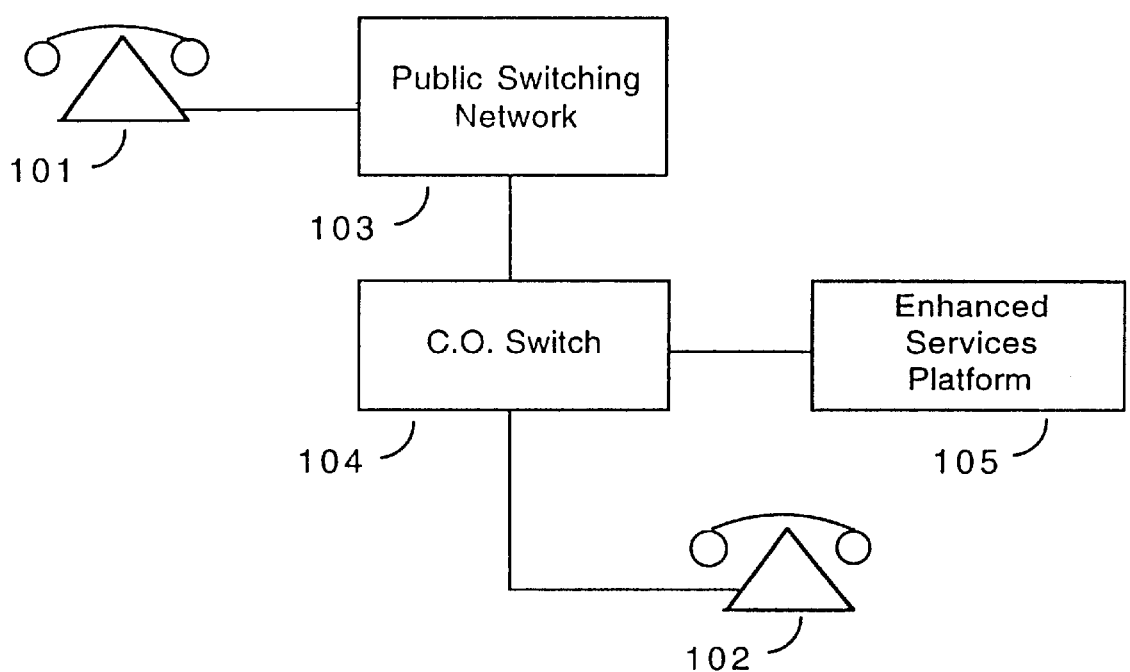
FIG. 1 of the accompanying drawing is a block diagram of a telephone system utilizing the information-on-hold service of the present invention.

The on-hold service of the present invention can be implemented on a central office switch, a PABX or an enhanced services platform or other computer, e.g., personal computer or work station, connected to such a switch or PABX. FIG. 1 shows the arrangement of the telephone system in which two parties could be connected together via a central office switch, and the on-hold service would be implemented on an enhanced services platform. The on-hold service of the present invention allows a party to place another party on-hold by connecting him to the on-hold service. That service provides the party placed on-hold with the capability of accessing the various types of information made available by that service, which could be audio, video, data, or a combination thereof. Accordingly, that service is referred to as information-on-hold service.

As shown in FIG. 1, telephone 101 is used by Party A to connect to telephone 102 which is used by Party B. The connection between telephone 101 and telephone 102 is via public switching network 103 and central office switch 104. If, however, both Party A and Party B were connected to central office switch 104, then there would be no need for the call to be placed through the public switching network 103, but rather Party A would be connected to Party B via central office switch 104 only. Once Party B decides that he wants to place Party A on-hold he can access the information-on-hold service by utilizing the transfer function or the hook switch flash. Central office switch 104 would respond to the hook switch flash generated by the hook switch or transfer button, by transferring the call to enhanced services platform (ESP) 105 which is connected to central office switch 104. In this preferred embodiment the information-on-hold software is implemented on ESP 105. Party B could then hang up the telephone and the call would be maintained by central office switch 104 and ESP 105.

A menu providing instructions and features would then be played by information-on-hold software and Party A would access the information accordingly. Either Party A or Party B can terminate the information service. If party A, i.e., the information user, wants to terminate the service the call is also terminated the same as if a party placed on hold had hung up. However, if Party B wants to cause the service to be terminated he can access the information-on-hold service and cause the user to be reconnected to Party B at that time, or Party B can leave a message with the service, to be sent to the user, advising him that Party B is now available for reconnection once the user terminates the information service.

If the user terminates the service, the ESP disconnects from the user and the user's instance of information-on-hold software is released and made available for use by another call. If the party who placed the call on hold, i.e., Party B, wants to be reconnected he would again access information-on-hold service and request that he be reconnected either immediately or when the user is ready. Party B would then hang up or wait for reconnection to the user and the information-on-hold software would send a message to the user advising him that he will be reconnected to Party B either immediately or when the user requests reconnection. The information-on-hold software would then either connect Party B to the user or call him when the user requests reconnection. In either case the connection would be reestablished through the switching network in the ESP.

Figure 2:
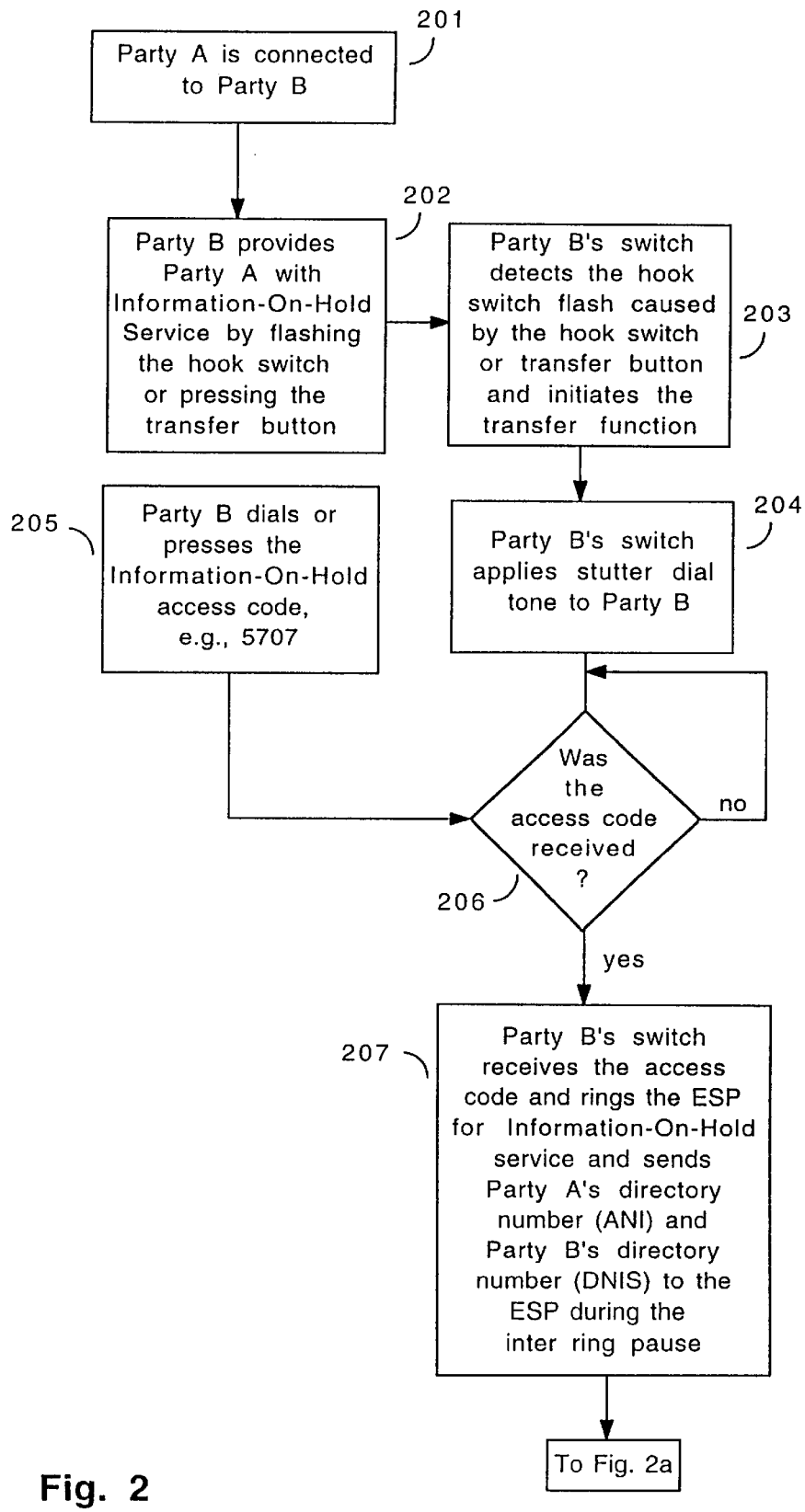
FIGS. 2–8 of the accompanying drawing are flow charts of the information-on-hold service of the present invention.

The actual operation of the information-on-hold service is shown in FIGS. 2–20. Referring now to FIG. 2, Party A is initially connected to Party B (block 201). The connection is via public switching telephone network 103 and central office (CO) switch 104, unless Party A is connected directly to the same switch as Party B. In the latter case Party A would be connected to Party B via CO switch 104 only. When Party B decides to place Party A on hold he indicates the process of providing Party A with access to information-on-hold service by flashing his hook switch or pressing the transfer button (block 202). Information-on-hold service would be installed on either CO switch 104 or ESP 105. In the implementation shown in FIG. 1 such software would typically be installed on ESP 105. Operation of the transfer button results in an on-hook signal similar to that caused by flashing the hook switch.

Central office switch 104 then detects Party B's hook switch flash, caused by either the hook switch or the transfer button, and initiates the transfer function (block 203). Party B's switch then applies stutter dial tone to Party B's telephone (block 204) and Party B then dials or presses the information-on-hold access code, e.g., 5707 (block 205). Party B's switch then waits for reception of the information-on-hold access code (block 206). Once Party B's switch receives the access code it rings the ESP for information-on-hold service and sends Party A's directory number and Party B's directory number to the ESP during the inter ring pause (block 207). Party A's directory number is provided via the automatic number identity (ANI) feature in the central office switch and Party B's directory number is provided under the Directory Number Information Service (DNIS) feature of the central office switch.

Figure 2A:
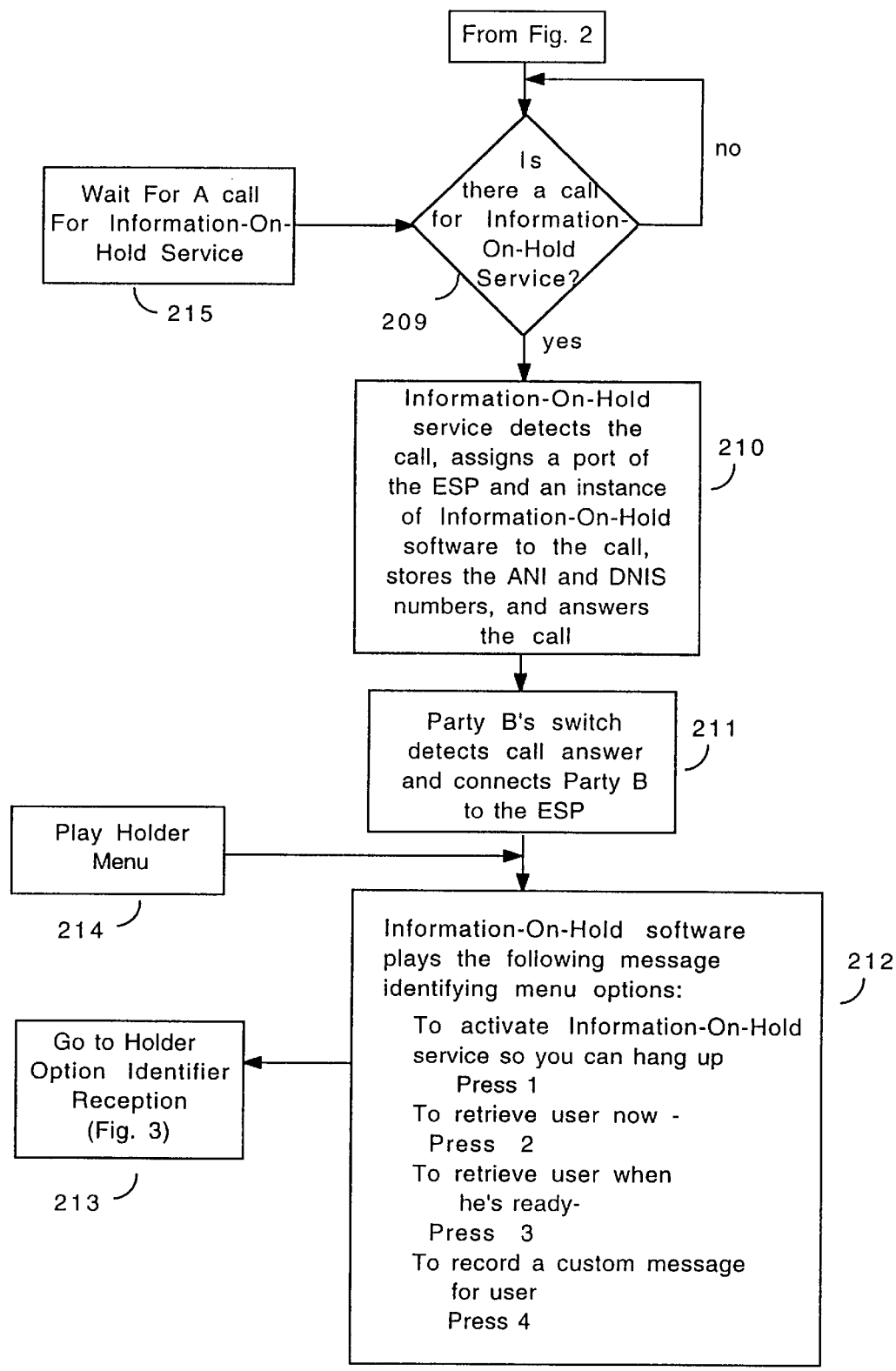

Referring now to FIG. 2a, once the ESP detects the call (block 209) it assigns a port of the ESP and instance of information-on-hold software to the call, and the information-on-hold software then stores the ANI and DNIS numbers and answers the call (block 210). Party B's switch then detects call answer and connects Party B to the ESP (block 211).

Information-on-hold software then plays a message identifying the menu options available to Party B. Those options include pressing 1 to activate the information-on-hold service, so Party B can hang up, pressing 2 to immediately retrieve a user who had previously been connected to information-on-hold service, pressing 3 to retrieve such a user when he is ready, and pressing 4 to record a custom message for the user (block 212). The information-on-hold software then goes to the Holder Option Identifier Reception mode of operation (block 213). The playing of the holder menu (block 212) can also be entered from other modes of operation of information-on-hold the software at the Play Holder Menu entry point (block 214). Also other modes of operation of information-on-hold software can transfer to block 215 to wait for a call for information-on-hold service.

Figure 3:
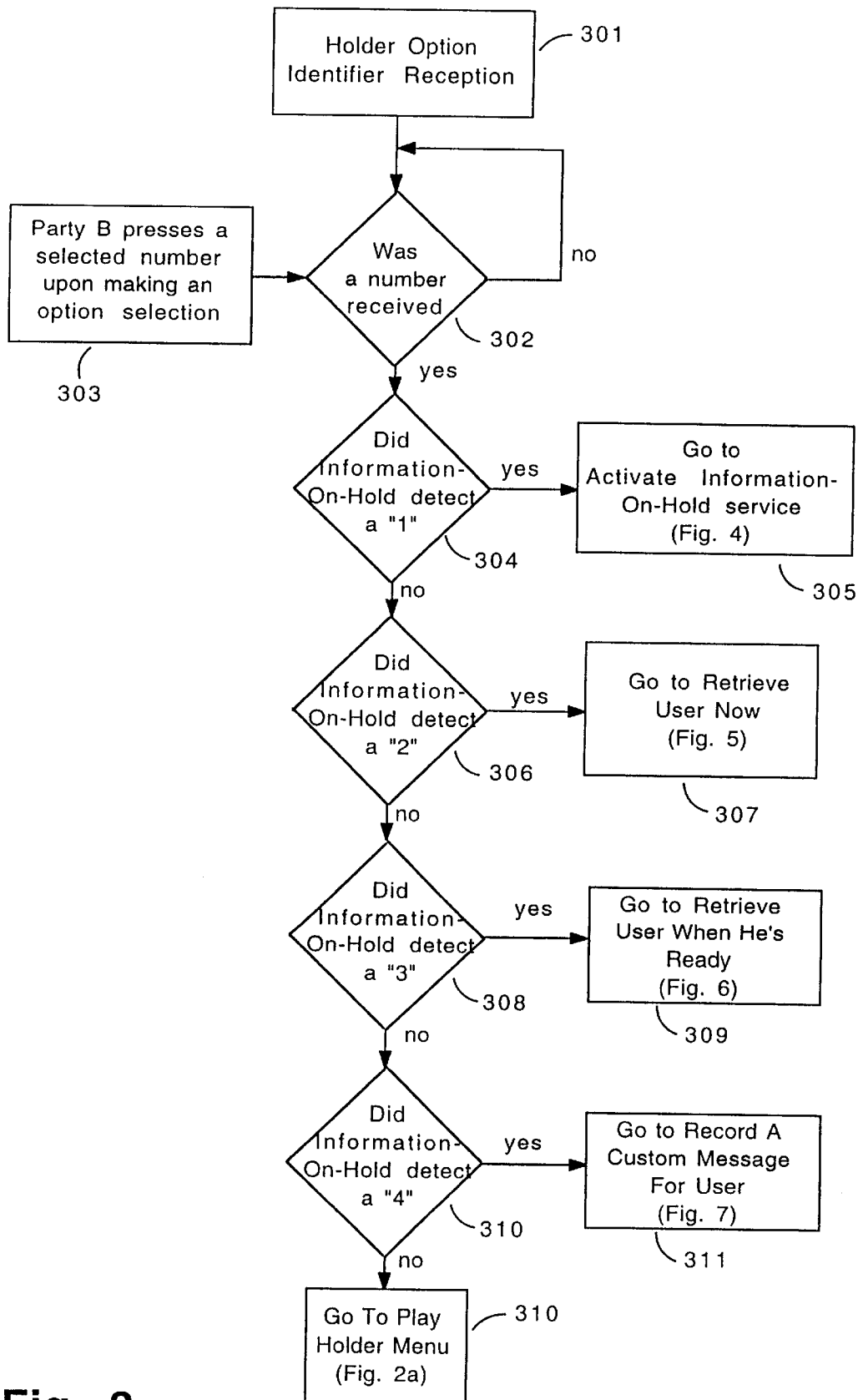

Referring now to FIG. 3, the information-on-hold software enters the Holder Option Identifier Reception mode of operation at block 301. In this mode of operation the information-on-hold software waits for a number to be received (block 302). While waiting for such a number, Party B makes an option selection and presses the corresponding number (block 303). Once such a number is received (block 302), the information-on-hold software analyzes it to determine whether it was a 1, 2, 3 or 4. If a number 1 had been detected (block 304), information-on-hold software goes to Activate Information-On-Hold Service (block 305). If a number 2 had been detected (block 306), information-on-hold software goes to Retrieve User Now (block 307). If a number 3 had been detected (block 308), information-on-hold software goes to Retrieve User When He's Ready (block 309). And, if a number 4 had been detected (block 310) information-on-hold software goes to Record A Custom Message For User (block 311). If an invalid number had been received information-on-hold software then returns to the Play Holder Menu mode of operation (block 312).

Figure 4:
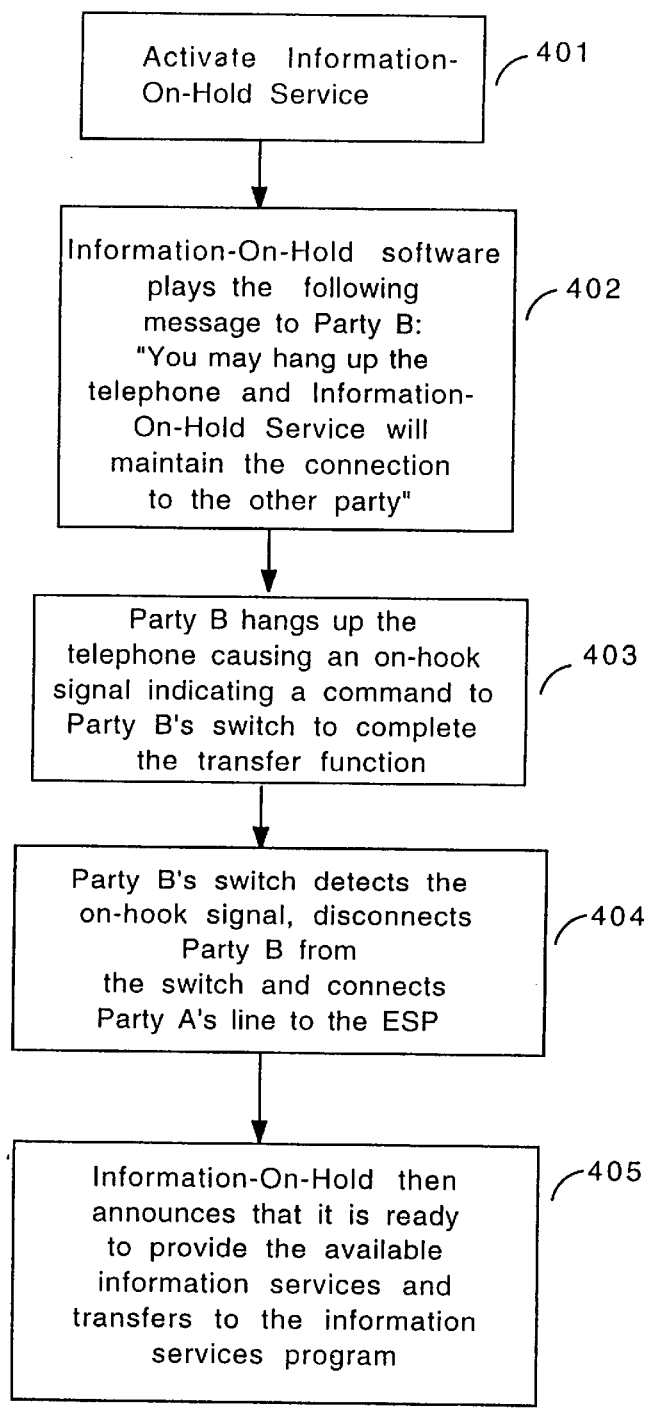

Referring now to FIG. 4 the information-on-hold software enters the Activate Information-On-Hold Service mode of operation at block 401. This mode of operation results from Party B having decided to connect Party A to information-on-hold service. Consequently, information-on-hold software plays a message to Party B informing him that he may hang up his telephone and information-on-hold service will maintain the connection to the other party, i.e., Party A (block 402). Party B then hangs up the telephone causing an on-hook signal which indicates a command to Party B's switch to complete the transfer function (block 403). Party B's switch then detects the on-hook signal, disconnects Party B from the switch, and completes the connection of Party A's line to the ESP (block 404).

Information-on-hold software, after waiting a predetermined time, such as 2 seconds, announces to Party A that it is ready to provide the available information services and transfers to the information services program (block 405). The information services that could be provided under this invention are virtually unlimited. Currently available services include interactive game playing, an example of which is disclosed in copending U.S. patent application (Attorney Docket No. 96-1-601), other old and well known services such as news, weather, and stock market information, and future undefined services. The information services program would announce a menu of available services to the user who would then key in his selection via his telephone keypad or other device, e.g., computer keypad, and the information services program would then transfer to the application program providing the service selected by the user.

Figure 5:
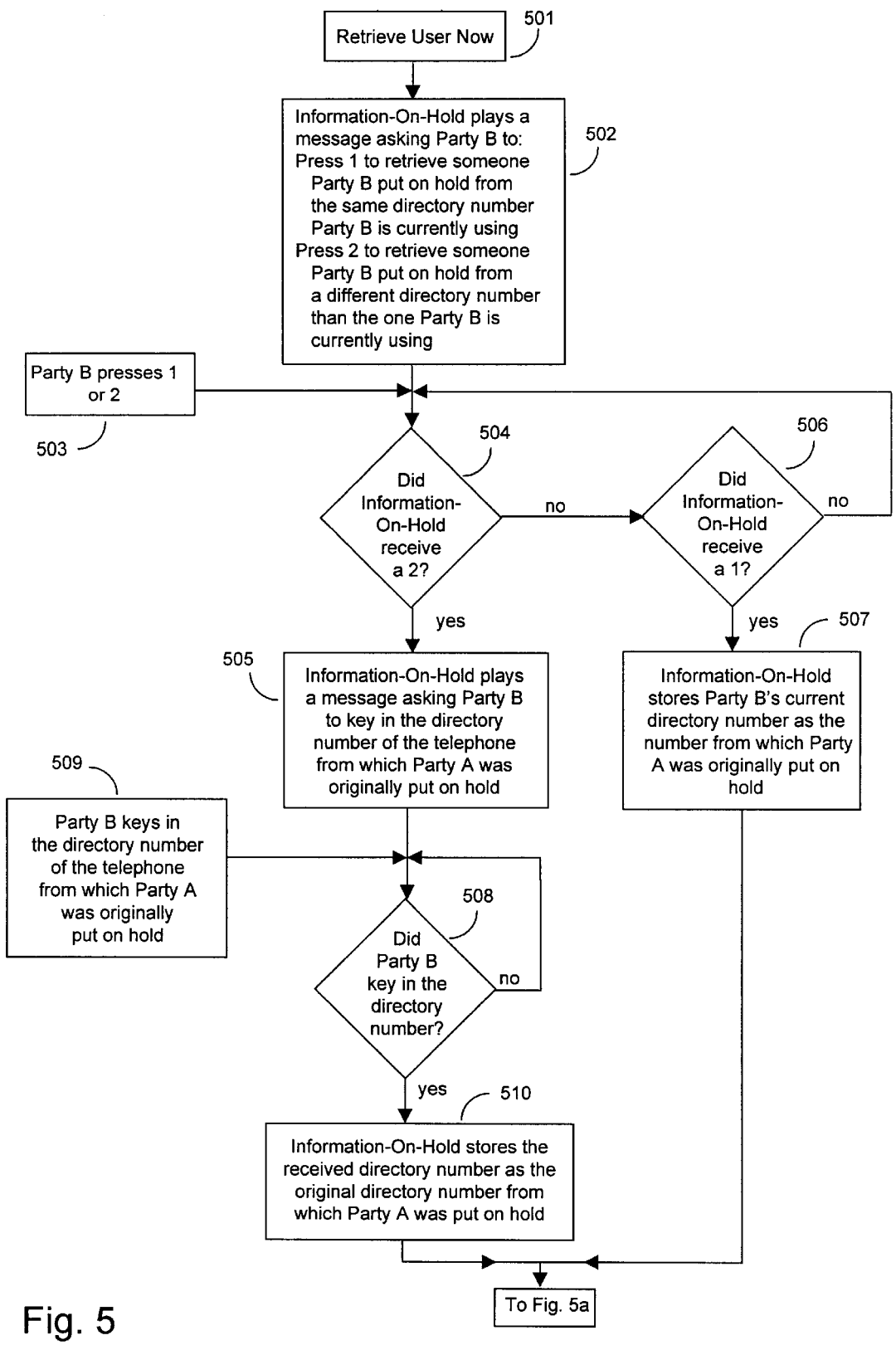

Referring now to FIG. 5 information-on-hold software enters the Retrieve User Now mode of operation at block 501. Information-on-hold software then plays a message asking Party B to:

press 1 to retrieve someone put on hold from the directory number he is currently using; or press 2 to retrieve someone put on hold from another directory number (block 502).

Information-on-hold software then waits for receipt of the number pressed by Party B. In response to the message played by information-on-hold software, Party B then presses a 1 or a 2 in accordance with the option he selected from the message played by information-on-hold software (block 503).

If information-on-hold software receives a 2, as pressed by Party B (block 504), information-on-hold software then plays a message asking Party B to key in the directory number of the telephone from which Party A was originally put on hold (block 505). And, if information-on-hold software receives a 1, as pressed by Party B (block 506), information-on-hold software stores Party B's current directory number as the number from which Party A was originally put on hold (block 507). Once information-on-hold software plays the message requesting Party B to key in the directory number of the telephone from which Party A was originally put on hold (block 505) it then waits for Party B to key in that directory number (block 508). Party B then keys in the directory number of the telephone from which Party A was originally placed on hold (block 509). Once information-on-hold software receives the telephone number keyed in by Party B (block 509) it then stores that directory number as the original directory number from which Party A was put on hold (block 510).

Figure 5A:
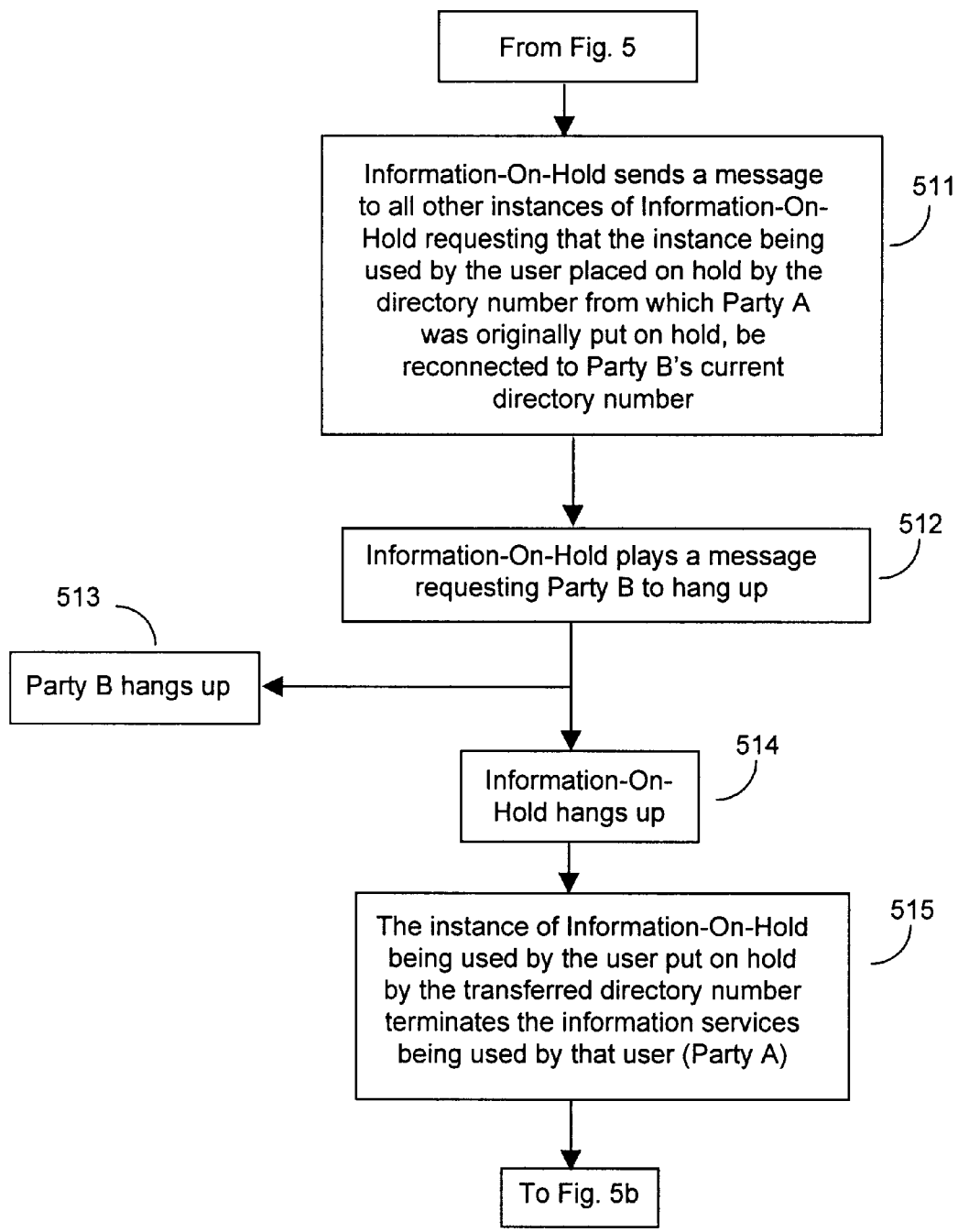

Referring now to FIG. 5a, information-on-hold software sends a message to all other instances of information-on-hold software requesting that the instance of information-on-hold being used by the user placed on hold by the directory number from which the user was originally put on hold, be reconnected to Party B's current directory number (block 511). That directory number and the name of Party B is also transferred to all such instances of information-on-hold software in the same message. Information-on-hold software then plays a message requesting Party B to hang up (block 512). Party B then hangs up (block 513) and Party B's instance of information-on-hold also hangs up (block 514). The instance of information-on-hold software being used by user placed on hold by the transferred directory number, i.e., user's instance of information-on-hold, terminates the information services being used by that user, i.e., Party A (block 515).

Referring now to FIG. 5b, the user's instance of information-on-hold software plays a message to Party A stating that he will now be reconnected to the other party, i.e., Party B (block 516). The user's instance of information-on-hold software then calls Party B via Party B's switch (block 517) and it then waits for receipt of answer supervision (block 518). Party B's switch then rings Party B (block 519) and Party B subsequently answers (block 520), causing Party B's switch to send answer supervision to the ESP. When the user's instance of information-on-hold software detects answer supervision (block 518) it connects Party A to Party B via the switch within the ESP (block 521). Party A and Party B then communicate with each other and ultimately hang up when they terminate their call (block 522). The user's instance of information-on-hold software then also hangs up (block 523). The user's instance of information-on-hold software then goes to the Wait For A Call For Information-On-Hold Service mode of operation (block 524).

Figure 6:
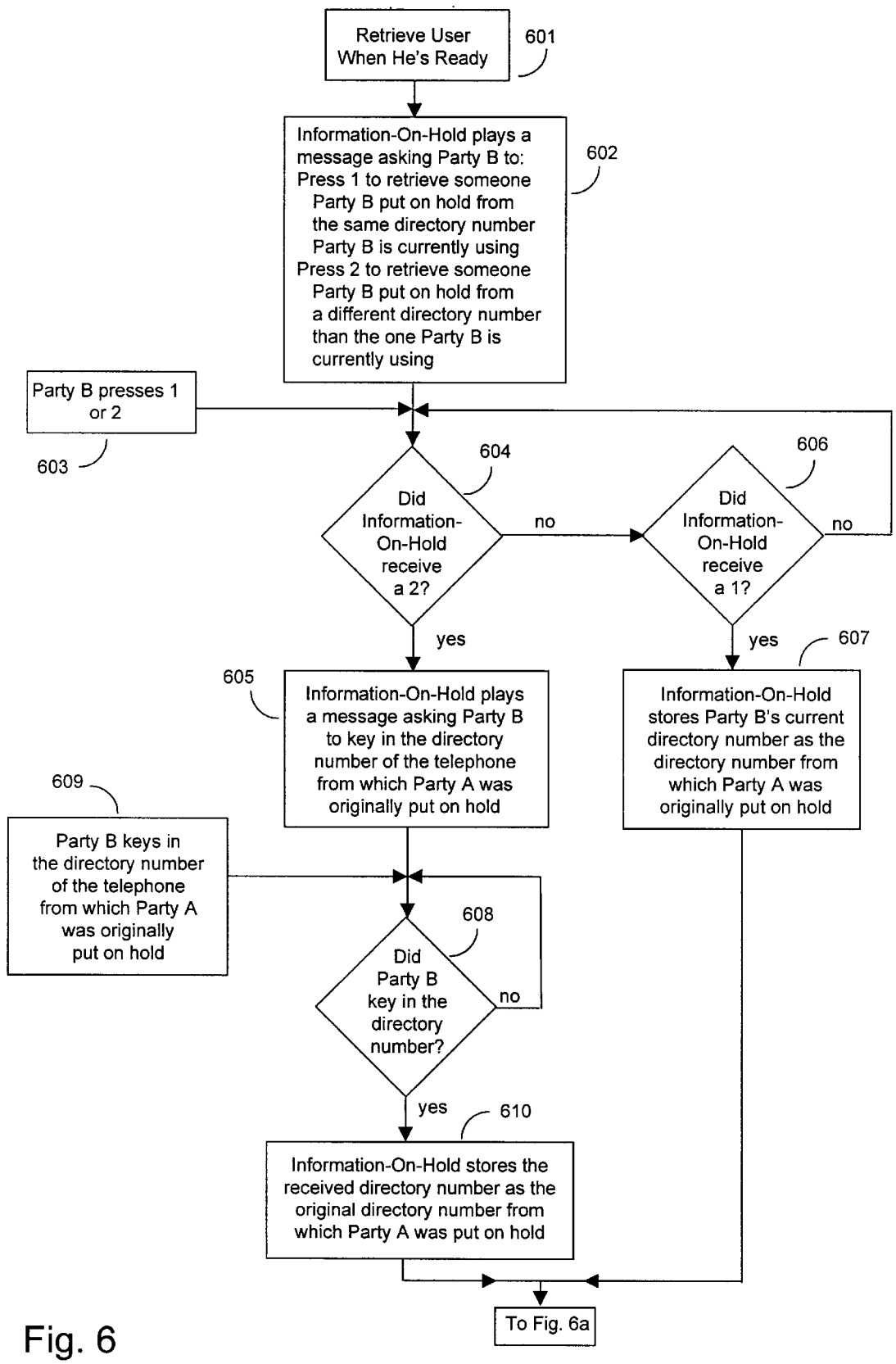

Referring now to FIG. 6, information-on-hold software enters the Retrieve User When He's Ready mode of operation at block 601. Information-on-hold software then plays a message asking Party B to:

press 1 to retrieve someone put on hold from the directory number he is currently using; or press 2 to retrieve someone put on hold from another directory number (block 602).

Information-on-hold software then waits for receipt of the number pressed by Party B. In response to the message played by information-on-hold software, Party B then presses a 1 or a 2 in accordance with the option he selected from the message played by information-on-hold software (block 603).

If information-on-hold software receives a 2, as pressed by Party B (block 604), information-on-hold software then plays a message asking Party B to key in the directory number of the telephone from which Party A was originally put on hold (block 605). And, if information-on-hold software receives a 1, as pressed by Party B (block 606), information-on-hold software stores Party B's current directory number as the number from which Party A was originally put on hold (block 607). Once information-on-hold software plays the message requesting Party B to key in the directory number of the telephone from which Party A was originally put on hold (block 605) it then waits for Party B to key in that directory number (block 608). Party B then keys in the directory number of the telephone from which Party A was originally placed on hold (block 609). Once information-on-hold software receives the telephone number keyed in by Party B (block 609) it then stores that directory number as the original directory number from which Party A was put on hold (block 610).

Figure 6A:
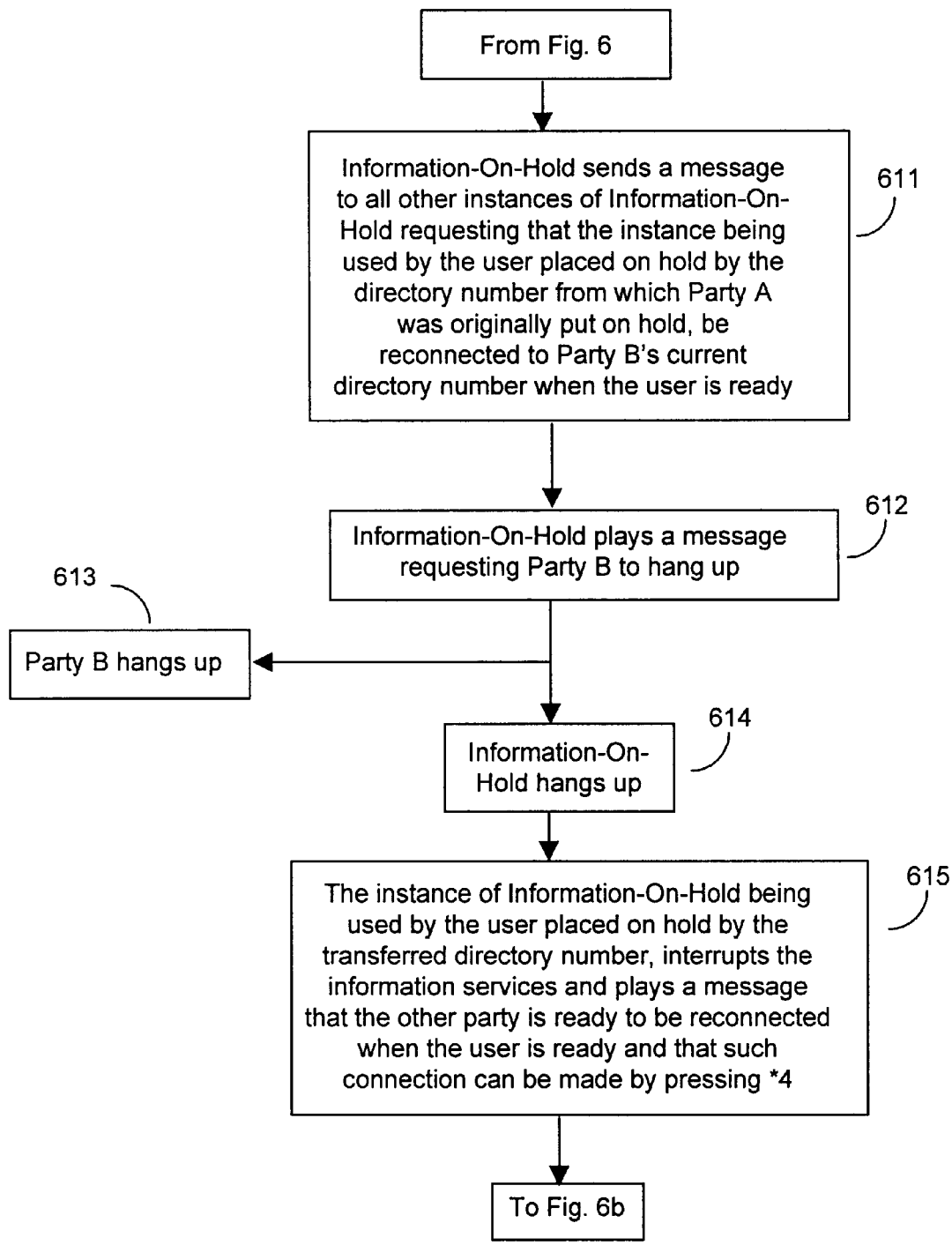

Referring now to FIG. 6a, information-on-hold software sends a message to all other instances of information-on-hold software requesting that the instance of information-on-hold being used by the user placed on hold from the directory number from which the user was originally put on hold, be reconnected to Party B's current directory number when the user is ready to be reconnected (block 611). That directory number and the name of Party B is also transferred to all such instances of information-on-hold software in the same message. Information-on-hold software then plays a message requesting Party B to hang up (block 612). Party B then hangs up (block 613) and information-on-hold hangs up (block 614). The instance of information-on-hold software being used by the user placed on hold by the transferred directory number, i.e., user's instance of information-on-hold, then interrupts the information service being used by that user, i.e., Party A. The user's instance of information-on-hold then plays a message that the other party, i.e., Party B, who is identified by name, is ready to be reconnected when the user is ready and that such connection can be made by pressing * (star) 4 (block 615).

Referring now to FIG. 6b, the user's instance of information-on-hold software continues the information service and periodically checks for receipt of the * 4 signals (block 616). When the user, i.e., Party A, is ready to be reconnected to Party B, he presses * 4 (block 617). When the user's instance of information-on-hold software detects receipt of the * 4 signals (block 618), it goes to the Quit mode of operation (block 619).

Figure 7:
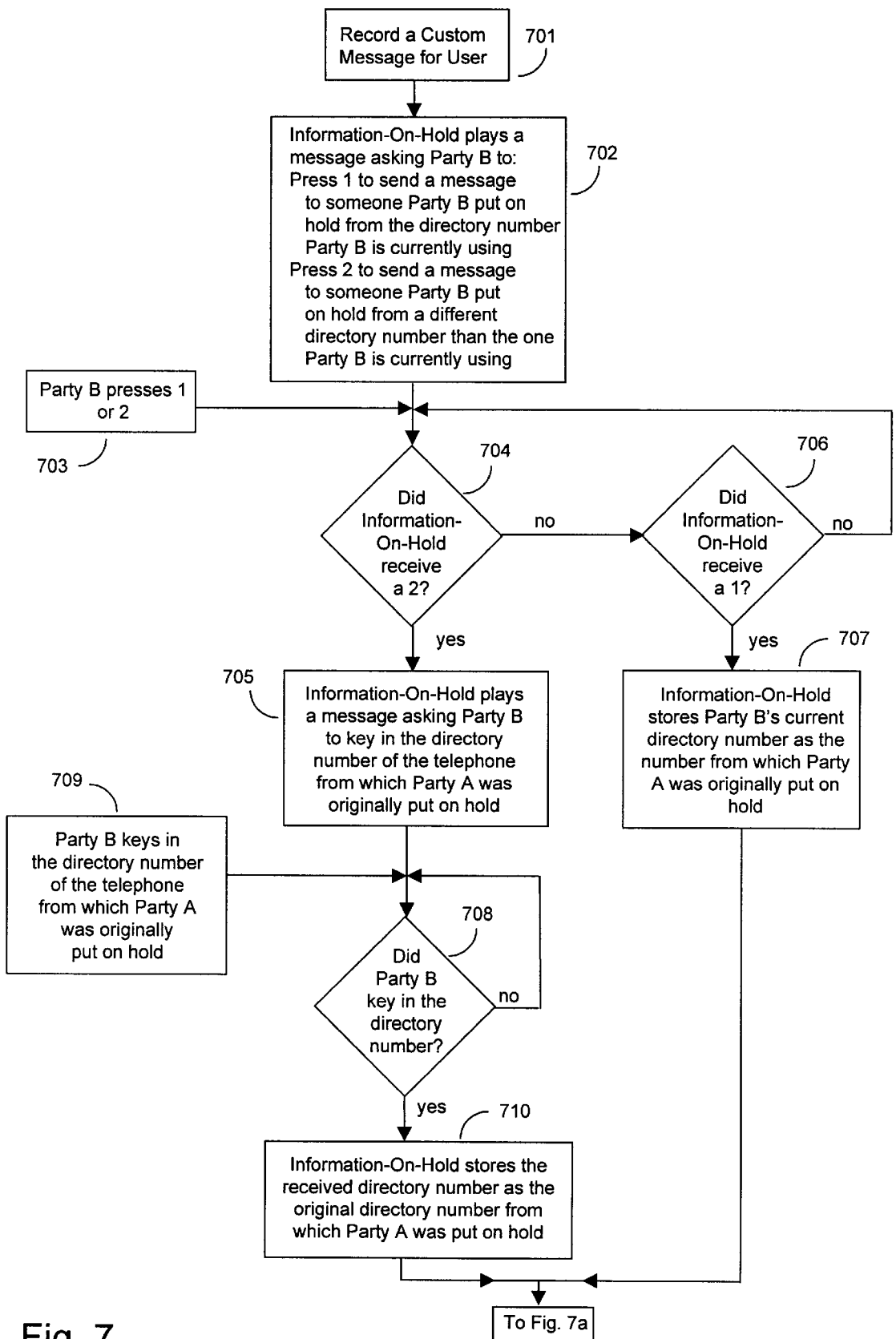

Referring now to FIG. 7, information-on-hold software enters the Record A Custom Message For User mode of operation at block 701. Information-on-hold software then plays a message asking Party B to:

press 1 to send a message to someone he put on hold from the directory number he is currently using; or press 2 to send a message to someone he put on hold from another directory number (block 702).

Information-on-hold software then waits for receipt of the number pressed by Party B. In response to the message played by information-on-hold software, Party B then presses a 1 or a 2 in accordance with the option he selected from the message played by information-on-hold software (block 703).

If information-on-hold software receives a 2, as pressed by Party B (block 704), information-on-hold software then plays a message asking Party B to key in the directory number of the telephone from which Party A was originally put on hold (block 705). And, if information-on-hold software receives a 1, as pressed by Party B (block 706), information-on-hold software stores Party B's current directory number as the number from which Party A was originally put on hold (block 707). Once information-on-hold software plays the message requesting Party B to key in the directory number of the telephone from which Party A was originally put on hold (block 705) it then waits for Party B to key in that directory number (block 708). Party B then keys in the directory number of the telephone from which Party A was originally placed on hold (block 709). Once information-on-hold software receives the telephone number keyed in by Party B (block 709) it then stores that directory number as the original directory number from which Party A was put on hold (block 710).

Referring now to FIG. 7a, information-on-hold software then plays a message asking Party B to record the message he wants information-on-hold software to send to the other party, i.e., the user, Party A (block 711). Information-on-hold software then waits for Party B to speak his message (block 712). Party B then speaks his message (block 713) and when information-on-hold software receives that message from Party B (block 712) it stores it for subsequent transmission to the user (block 714). Information-on-hold software then plays a message to Party B asking him to hang up (block 715). Party B then hangs up (block 716), and information-on-hold software sends a message to all other instances of information-on-hold software stating that the recorded message being transferred to all such instances is for the user placed on hold by the directory number from which the user was originally put on hold (block 717). That directory number and the name of Party B are also transferred to all such instances of information-on-hold software in the same message. Information-on-hold software then hangs up (block 718).

Referring now to FIG. 7b, the instance of information-on-hold software being used by the user placed on hold by the so transferred directory number, interrupts the information services, and plays a message stating that it is going to play a message from Party B, who is identified by name, (block 719). The instance of information-on-hold software being used by that user, i.e, the user's instance of information-on-hold, then plays the message recorded by Party B (block 720). The user's instance of information-on-hold software then returns to the information services program (block 721).

The various instances of information-on-hold software can communicate with each other and they do so through a message queue. At various points within the application programs each instance of information-on-hold software checks the message queue to see if there are any messages for it. Messages for other instances are ignored while messages for that instance are processed upon retrieving them from the queue. The message format includes fields identifying the type of message, the directory number of the instance of information-on-hold software it is directed to (i.e., the directory number of the associated user which is known by that instance of information-on-hold software) the directory number associated with the instance of information-on-hold software sending the message, the message text, and any other message specific parameters.

Figure 8:
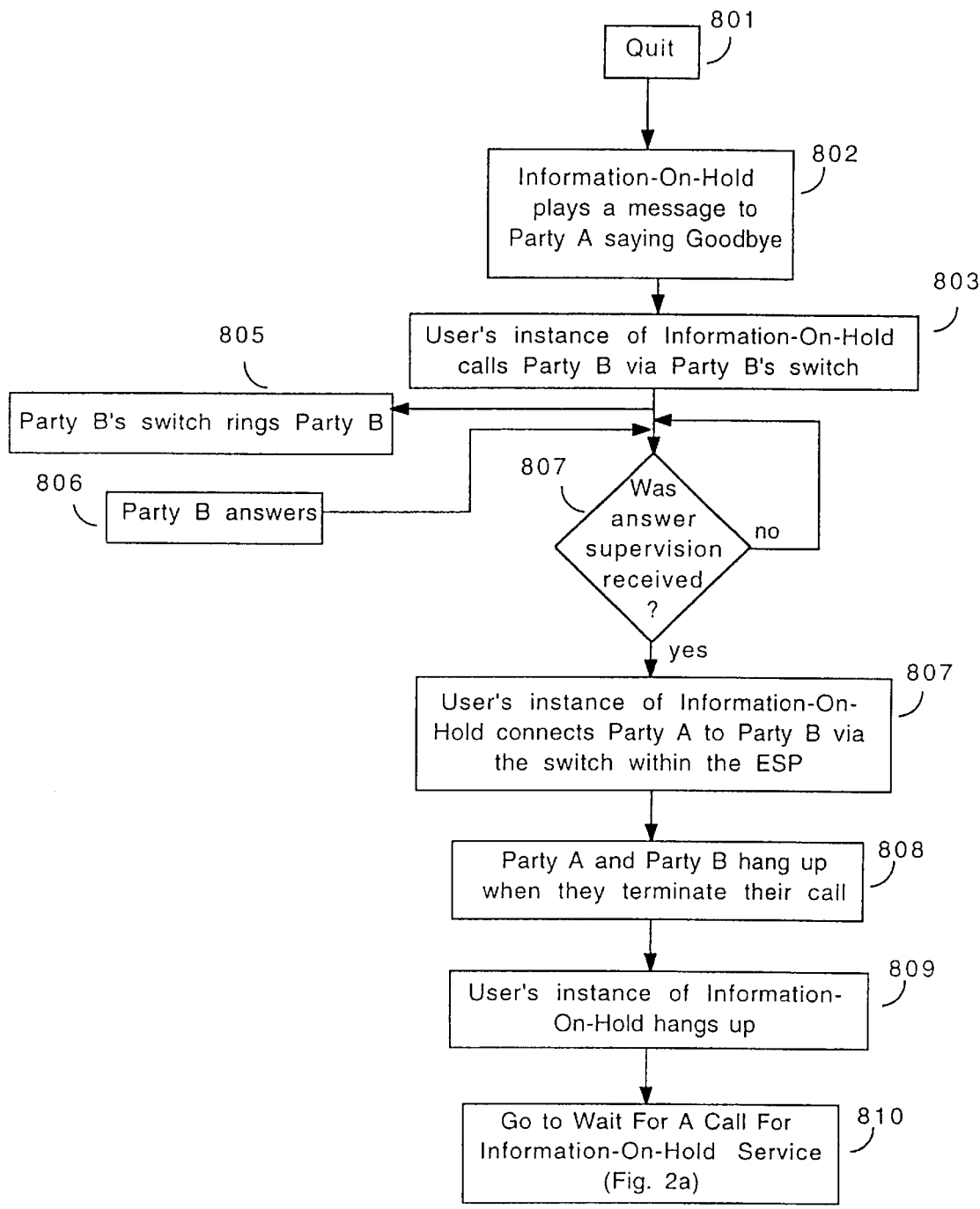

Referring now to FIG. 8, information-on-hold software enters the Quit mode of operation at block 801. In this mode of operation information-on-hold software plays a message to Party A saying "goodbye" (block 802). The user's instance of information-on-hold software then calls Party B via Party B's switch (block 803) and it then waits for receipt of answer supervision (block 804). Party B's switch then rings Party B (block 805) and Party B subsequently answers (block 806), causing Party B's switch to send answer supervision to the ESP. When the user's instance of information-on-hold software detects answer supervision (block 804) it connects Party A to Party B via the switch within the ESP (block 807). Party A and Party B then communicate with each other and ultimately hang up when they terminate their call (block 808). The user's instance of information-on-hold software then also hangs up (block 809). The user's instance of information-on-hold software then goes to the Wait For A Call For Information-On-Hold Service mode of operation (block 810).

The information-on-hold software could also include a menu identifying various options available to the user, such as pressing a "4" to be transferred to the Quit mode of operation, as disclosed in copending application "Games-On-Hold Telephony Service" (Attorney Docket No. 96-1-601).

Figure 9:
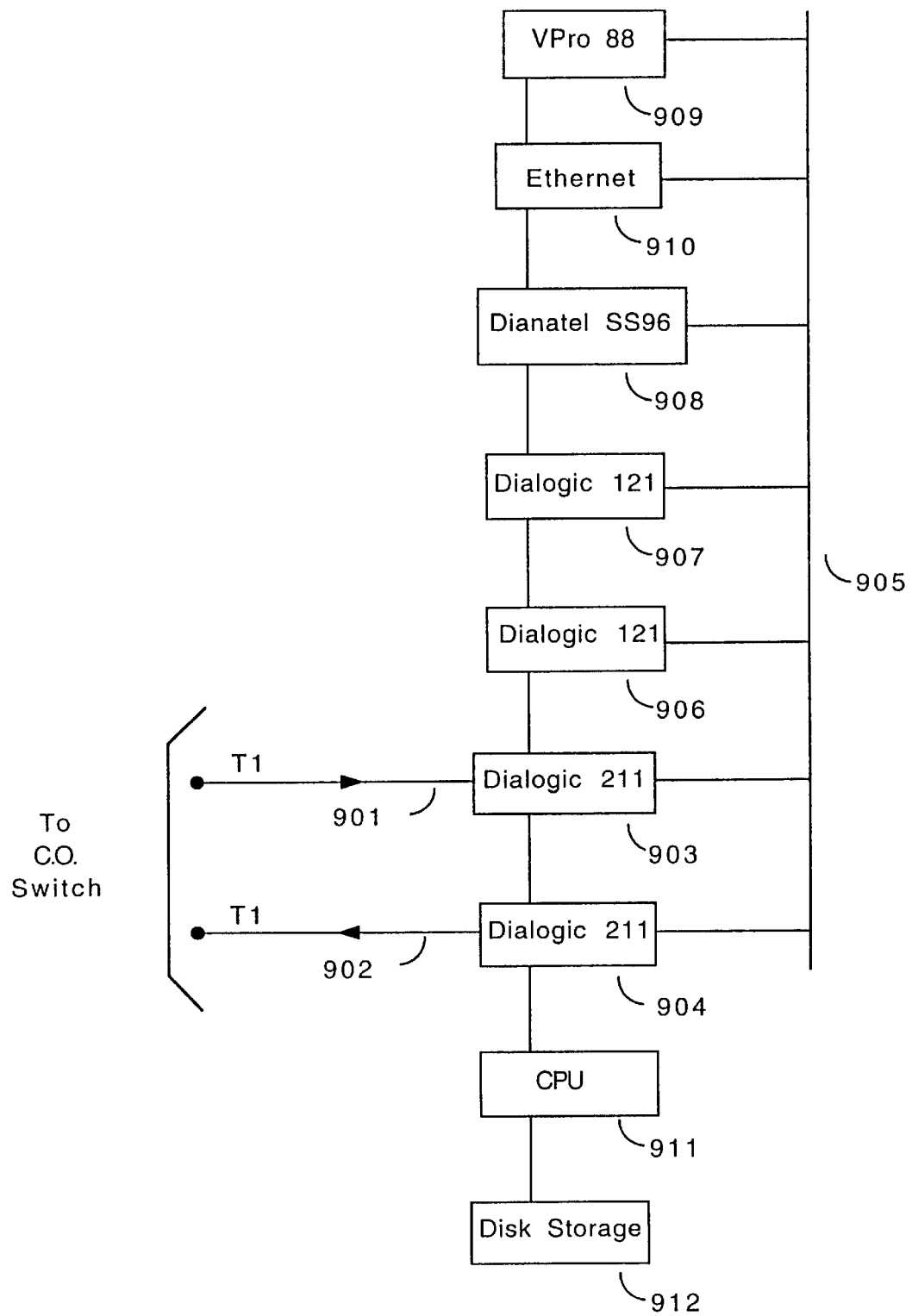
FIG. 9 is a block diagram of the Enhanced Services Platform of the present invention.

Referring now to FIG. 9, the ESP of the present invention is shown. The ESP interfaces with C.O. Switch 104 (FIG. 1) via incoming and outgoing T1 leads 901 and 902, respectively. Those leads are connected to Dialogic 211 cards 903 and 904, respectively, and they are also connected to voice bus 905. Dialogic 121 cards 906 and 907, Dianatel SS96 card 908, and V Pro-88 card 909 are also connected to voice bus 905. Ethernet 910 is connected between Dianatel SS96 card 908 and V Pro-88 card 909. Dialogic 121 cards 906 and 907 are connected to each other and Dialogic 121 card 907 is further connected to Dianatel SS96 card 908. Dialogic 211 cards 903 and 904 are connected to each other and Dialogic 211 card 903 is further connected to Dialogic 121 card 906. CPU 911 is connected between Disk Storage 912 and Dialogic 211 card 904.

Dialogic 211 cards 903 and 904 are interface cards to CO Switch 104 via T1 trunks 901 and 902, respectively. Dialogic 121 cards 906 and 907 are voice resources for playing prompt messages, collecting digits, recording voice files and making phone calls. Dianatel SS96 card 908 provides an internal switching network within the ESP to switch voice channels from the Dialogic 121 and 211 cards and the V Pro-88 card, which provides for voice recognition of answers to the prompt messages. CPU 911 runs the operating system and application software of the information-on-hold invention, and Disk Storage 912 provides permanent storage for information-on-hold software, voice files and data. Ethernet 910 provides networking capability for the system to expand into multiple units.

The above-described embodiment of information-on-hold is a novel arrangement for providing a person placed on hold with the opportunity to acquire information while on hold rather than merely wait discontentedly for the other party to return to the call.

Figure 10:
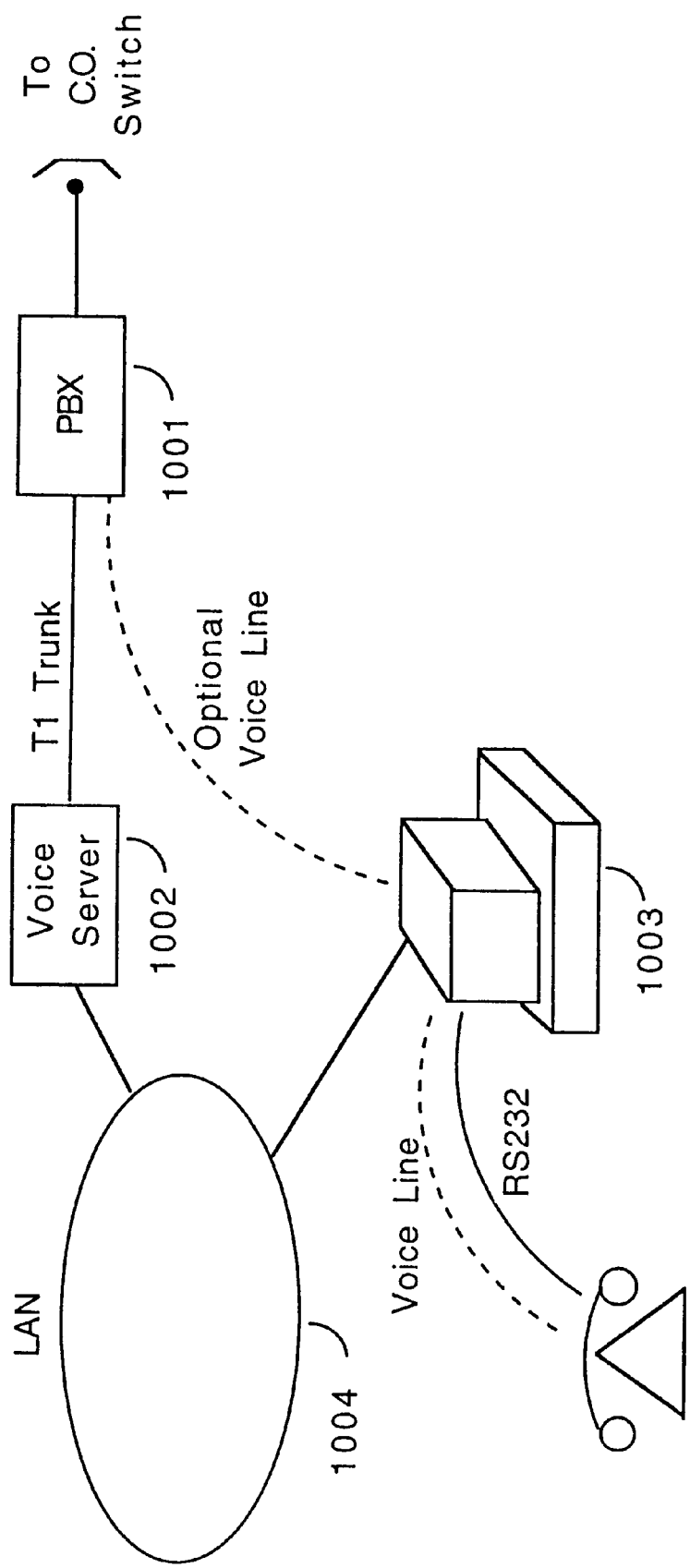
FIG. 10 is a block diagram of an alternative embodiment of the information-on-hold service of the present invention.

An alternative embodiment of the present invention is shown in FIG. 10. In that embodiment a subscriber's PC, i.e., Personal Computer, work station or other microcomputer, is used as the ESP. In FIG. 10 PBX 1001 is shown connected to Voice Server 1002 via a T1 trunk. Voice Server 1002 is further connected to PC 1003 via Local Area Network (LAN) 1004. In such an arrangement, known as computer telephony integration (CTI), calls come into PBX 1001 and go to Voice Server 1002, which contacts the subscriber via LAN 1004 and PC 1003. Using his keyboard or mouse, the subscriber tells PC 1003 to tell Voice Server 1002 to tell PBX 1001 how to handle the call, e.g., answer the call, take a message, put the call on hold, etc. In such an arrangement information-on-hold software and associated ESP cards, e.g., Dialogic, etc., could be added to the PC to allow the PC to operate as the ESP. Another alternative embodiment would be to implement the information-on-hold service within the CO switching system or other telecommunications network element. Thus, the ESP and information-on-hold software could be implemented at various points in the telecommunications network to provide the features claimed in the present invention.

A further alternative embodiment of the present invention utilizes a "Direct call access" feature rather than the call transfer feature. In this arrangement the information-on-hold subscriber calls the ESP directly, typically with a 7 digit telephone number. The ESP then asks what number to call and the information-on-hold subscriber dials or keys in that number. The ESP then calls that number and the subscriber hangs up while the ESP maintains the call with the other party. All other aspects of the information-on-hold service operate as previously described for the preferred embodiment.

This alternative embodiment applies best to telephone systems where call transfer is not available, for example many residential areas. It is also useful in small offices and with key telephone systems. Thus, the information-on-hold service can also be accessed in various ways to provide the features claimed in the present invention.

It will be obvious to those skilled in the art that numerous modifications of the present invention could be made without departing from the spirit of the invention which is limited only by the scope of the claims appended hereto.

What is claimed is:

1. An information-on-hold system for use with an information services program, and a switching system which is connected to both a first party's telecommunication device and the telecommunication device of a subscriber to information-on-hold service, said subscriber's telecommunication device being operated to cause said switching system to provide an information-on-hold access signal, an information-on-hold activation signal, and a reconnection now signal, said switching system being further operated to provide a connection of said subscriber's telecommunication device to a specific part of said information-on-hold system, a combination disconnection of said subscriber's telecommunication device from, and connection of said first party's telecommunication device to, specific parts of said information-on-hold system, and a reconnection of said subscriber's telecommunication device to a specific part of said information-on-hold system, said information-on-hold system comprising;

processing means; and a network having a plurality of ports;

said processing means being operated in response to said information-on-hold access signal to send a signal to said switching system requesting said switching system to connect said subscriber's telecommunication device to one of said ports;

said processing means being further operated in response to said connection of said subscriber's telecommunication device to one of said ports to send a message to said switching system instructing said subscriber to provide a particular response to cause said switching system to provide said information-on-hold activation signal;

said processing means being further operated in response to said information-on-hold activation signal to send a message to said switching system instructing said subscriber to hang up to cause said switching system to provide a combination disconnection of said subscriber's telecommunication device from said one of said ports and connection of said first party's telecommunication device to one of said ports;

said processing means being further operated in response to said connection of said first party's telecommunication device to one of said ports to cause said information services program to be coupled to said connection to said first party's telecommunication device;

said processing means being further operated in response to said reconnection of said subscriber's telecommunication device to one of said ports to send a message to said switching system instructing said subscriber to provide a particular response to cause said switching system to provide said reconnection now signal;

said processing means being further operated in response to said reconnection now signal, to decouple said information services program, to send a message to said switching system advising said first party that the first party will now be reconnected to the subscriber, and to connect the port connected to said subscriber's telecommunication device to the port connected to said first party's telecommunication device.

2. An information-on-hold system as claimed in claim 1 wherein said processing means comprises separate instances of information-on-hold software for each port.

3. An information on hold system as claimed in claim 1 wherein the processing means is a microcomputer.

4. An information hold system as claimed in claim 1 wherein the processing means is in the switching system.

5. An information hold system as claimed in claim 1 wherein the processing mean is accessed directly by said subscriber.

6. An information hold system as claimed in claim 1 wherein said processing means is further operated to send to said first party a message recorded by said subscriber.

7. An information-on-hold system for use with an information services program, and a switching system which is connected to both a first party's telecommunication device and the telecommunication device of a subscriber to information-on-hold service, said subscriber's telecommunication device being operated to cause said switching system to provide an information-on-hold access signal, an information-on-hold activation signal, and a reconnection now signal, said switching system being further operated to provide a connection of said subscriber's telecommunication device to a specific part of said information-on-hold system, a combination disconnection of said subscriber's telecommunication device from, and connection of said first party's telecommunication device to, specific parts of said information-on-hold system, a reconnection of said subscriber's telecommunication device to a specific part of said information-on-hold system, a disconnection of said subscriber's telecommunication device from said information-on-hold system, and a second reconnection of said subscriber's telecommunication device to a specific part of said information-on-hold system, said information-on-hold system comprising;

processing means; and a network having a plurality of ports;

said processing means being operated in response to said information-on-hold access signal to send a signal to said switching system requesting said switching system to connect said subscriber's telecommunication device to one of said ports;

said processing means being further operated in response to said connection of said subscriber's telecommunication device to one of said ports to send a message to said switching system instructing said subscriber to provide a particular response to cause said switching system to provide said information-on-hold activation signal;

said processing means being further operated in response to said information-on-hold activation signal to send a message to said switching system instructing said subscriber to hang up to cause said switching system to provide a combination disconnection of said subscriber's telecommunication device from said one of said ports and connection of said first party's telecommunication device to one of said ports;

said processing means being further operated in response to said connection of said first party's telecommunication device to one of said ports to cause said information services program to be coupled to said connection to said first party's telecommunication device;

said processing means being further operated in response to said reconnection of said subscriber's telecommunication device to one of said ports to send a message to said switching system instructing said subscriber to provide a particular response to cause said switching system to provide said reconnection now signal;

said processing means being further operated in response to said reconnection now signal, to decouple said information services program, to send a message to said switching system instructing said subscriber to hang up, to send a message to said switching system advising said first party that the first party will now be reconnected to the subscriber, and to send a signal to said switching system requesting said subscriber's telecommunication device be reconnected to one of said ports;

said processing means being further operated in response to said disconnection of said subscriber's telecommunication device from and said second reconnection of said subscriber's telecommunication device to, one of said ports, to connect the port connected to said subscriber's telecommunication device to the port connected to said first party's telecommunication device.

8. An information-on-hold system as claimed in claim 7 wherein said processing means comprises separate instances of information-on-hold software for each port.

9. An information on hold system as claimed in claim 7 wherein the processing means is a microcomputer.

10. An information hold system as claimed in claim 7 wherein the processing means is in the switching system.

11. An information hold system as claimed in claim 7 wherein the processing mean is accessed directly by said subscriber.

12. An information hold system as claimed in claim 7 wherein said processing means is further operated to send to said first party a message recorded by said subscriber.

13. An information-on-hold system for use with an information services program, and a switching system which is connected to both a first party's telecommunication device and the telecommunication device of a subscriber to information-on-hold service, said subscriber's telecommunication device being operated to cause said switching system to provide an information-on-hold access signal, an information-on-hold activation signal, a reconnection when ready signal, and a ready for reconnection signal, said switching system being further operated to provide a connection of said subscriber's telecommunication device to a specific part of said information-on-hold system, a combination disconnection of said subscriber's telecommunication device from, and connection of said first party's telecommunication device to, specific parts of said information-on-hold system, a reconnection of said subscriber's telecommunication device to a specific part of said information-on-hold system, a disconnection of said subscriber's telecommunication device from said information-on-hold system, and a second reconnection of said subscriber's telecommunication device to a specific part of said information-on-hold system, said information-on-hold system comprising;

processing means; and a network having a plurality of ports;

said processing means being operated in response to said information-on-hold access signal to send a signal to said switching system requesting said switching system to connect said subscriber's telecommunication device to one of said ports;

said processing means being further operated in response to said connection of said subscriber's telecommunication device to one of said ports to send a message to said switching system instructing said subscriber to provide a particular response to cause said switching system to provide said information-on-hold activation signal;

said processing means being further operated in response to said information-on-hold activation signal to send a message to said switching system instructing said subscriber to hang up to cause said switching system to provide a combination disconnection of said subscriber's telecommunication device from said one of said ports and connection of said first party's telecommunication device to one of said ports;

said processing means being further operated in response to said connection of said first party's telecommunication device to one of said ports to cause said information services program to be coupled to said connection to said first party's telecommunication device;

said processing means being further operated in response to said reconnection of said subscriber's telecommunication device to one of said ports to send a message to said switching system instructing said subscriber to provide a particular response to request said switching system to provide said reconnection when ready signal;

said processing means being further operated in response to said reconnection when ready signal, to send a message to said switching system instructing said subscriber to hang up, and to send a message to said switching system advising said first party to provide a particular response when he is ready to be reconnected;

said processing means being further operated in response to said ready for reconnection signal to decouple said information services program, and to send a signal to said switching system requesting that said subscriber's telecommunication device be reconnected to said information-on-hold system;

said processing means being further operated in response to said disconnection of said subscriber's telecommunication device from, and said second reconnection of said subscriber's telecommunication device to, one of said ports, to connect the port connected to said subscriber's telecommunication device to the port connected to said first party's telecommunication device.

14. An information-on-hold system as claimed in claim 13 wherein said processing means comprises separate instances of information-on-hold software for each port.

15. An information on hold system as claimed in claim 13 wherein the processing means is a microcomputer.

16. An information hold system as claimed in claim 13 wherein the processing means is in the switching system.

17. An information hold system as claimed in claim 13 wherein the processing mean is accessed directly by said subscriber.

18. An information hold system as claimed in claim 13 wherein said processing means is further operated to send to said first party a message recorded by said subscriber.

* * * * *